(12) United States Patent
Bartoli (10) Patent No.: US 11,467,615 B2
(45) Date of Patent: Oct. 11, 2022

(54) ELECTRONIC DEVICE FOR MEASURING A SPECIFIC QUANTITY WITH A TWO-WIRE INTERFACE

(71) Applicant: AUTOVIB, Miserey-Salines (FR)

(72) Inventor: Frédéric Bartoli, Saint Etienne de Crossey (FR)

(73) Assignee: AUTOVIB

( * ) Notice: Subject to any disclaimer, the term of this patent is extended or adjusted under 35 U.S.C. 154(b) by 658 days.

(21) Appl. No.: 16/387,740

(22) Filed: Apr. 18, 2019

(65) Prior Publication Data

US 2019/0361473 A1  Nov. 28, 2019

(51) Int. Cl.
*G05F 1/63* (2006.01)
*G01P 15/08* (2006.01)
*G01P 15/09* (2006.01)
*G01D 21/00* (2006.01)

(52) U.S. Cl.
CPC .............. *G05F 1/63* (2013.01); *G01D 21/00* (2013.01); *G01P 15/0802* (2013.01); *G01P 15/09* (2013.01)

(58) Field of Classification Search
CPC ...... G01P 15/0802; G01P 15/12; G01P 15/09; G01P 15/08; G01D 21/00; G05F 1/63
See application file for complete search history.

(56) References Cited

U.S. PATENT DOCUMENTS

| 3,749,946 | A | * | 7/1973 | Von Ruti | .................. H03F 3/70 |
| | | | | | 310/319 |
| 4,085,349 | A | * | 4/1978 | Farstad | ..................... G01P 3/42 |
| | | | | | 310/319 |
| 4,178,525 | A | | 12/1979 | Barr | |
| 5,088,326 | A | * | 2/1992 | Wada | .................. G01P 15/0907 |
| | | | | | 73/514.34 |
| 8,179,121 | B2 | | 5/2012 | Hynd et al. | |
| 2010/0244813 | A1 | | 9/2010 | Hynd | |
| 2011/0282467 | A1 | | 11/2011 | Schulte | |

FOREIGN PATENT DOCUMENTS

WO  0026739  5/2000

* cited by examiner

*Primary Examiner* — Helen C Kwok
(74) *Attorney, Agent, or Firm* — Burr & Forman LLP; Harvey S. Kauget (57) ABSTRACT

The invention relates to an electronic device for measuring a specific quantity, the device having a two-wire interface having two connection terminals intended to be connected to a conductive pair supplying the measuring device and conveying in return an electrical quantity representative of the measured quantity. The device comprises a transducer providing a raw measurement of the determined quantity, a processing stage for conditioning the raw measurement, the processing stage including one input connected to the transducer and one output, a regulator electrically connected to the processing stage. The regulator includes an input port electrically connected to the two connection terminals of the two-wire interface and an output port supplying regulated voltage to the transducer and/or to the processing stage. The device also includes a feedback circuit electrically connected to the regulator input port and to the processing stage.

20 Claims, 6 Drawing Sheets

ELECTRONIC DEVICE FOR MEASURING A SPECIFIC QUANTITY WITH A TWO-WIRE INTERFACE

FIELD OF THE INVENTION

This invention relates to a measuring device with a "two-wire" interface, for example of the IEPE type.

BACKGROUND OF THE INVENTION

Measuring devices, such as piezoelectric accelerometers, with a so-called "two-wire" interface, are known to be connected to remote measuring equipment via a single pair of conductive wires (more simply referred to as a "conductive pair" in the following description).

The conductive pair is used to electrically supply the measuring device and to convey back an electrical quantity representative of the measured quantity. One of the wires of the conductive pair can convey ground and the other one the useful voltage, representative of the measured quantity.

According to this approach, often referred to as IEPE (Integrated Electronic PiezoElectric), the measuring device is powered by a constant current and modulates the voltage on the conductive pair to convey and transmit the measurement to the remote equipment.

The high impedance constant current source is integrated into the measuring equipment and provides an intensity of a few milliamperes, typically between 2 and 20 milliamperes. This source is capable of holding a voltage in a range from 0V to 24V in some known devices. The quiescent point at the output of the measuring device is fixed in the middle of this range, which in principle allows a measuring dynamics of +/−12V.

The simple implementation of such a measuring device and its immunity to noise has led to its widespread use in industrial environments.

Modern measuring devices include, in addition to the transducer for providing a raw measurement of the physical quantity from which a measurement is to be acquired, a processing stage for conditioning this raw measurement, for example to filter and/or amplify same. This processing stage may require an electrical power supply, usually via a fixed low impedance voltage. Some transducers may also require such a power supply, as may be the case with MEMS-based accelerometers.

This (constant voltage and low impedance) power supply is not directly compatible with the one provided by the two-wire interface. It is therefore necessary to include in the measuring device an auxiliary power supply circuit (also referred to in this application as a "regulator") to enable this power supply function to be performed.

A measuring device comprising a MEMS transducer, an amplification and filtering stage, and a two-wire interface of the IEPE type is known from document U.S. Pat. No. 8,179,121. Between the connection terminals of the two-wire interface, a Zener diode is arranged in series with an amplification stage, and forms a regulator providing a constant voltage of 5V used to supply the transducer and the amplification and filtering stage.

In the configuration proposed in this document, the constant voltage developing at the diode terminals is a direct component of the signal provided at the two-wire interface. This assembly therefore limits the voltage excursion that can occur between the terminals of this interface. The disturbances induced on the output signal of the measuring device, for example due to the necessary difference between the characteristics of the diode and its specified characteristics, cannot be directly corrected by a feedback loop in the proposed architecture.

PURPOSE OF THE INVENTION

The purpose of this invention is to provide a measuring device with a two-wire interface and a different architecture, which at least partially addresses the problems of the state of the art solution architecture.

BRIEF DESCRIPTION OF THE INVENTION

In order to achieve one of these purposes, the subject matter of the invention proposes an electronic device for measuring a determined quantity, the device having a two-wire interface having two connection terminals intended to be connected to a conductive pair supplying the measuring device and conveying in return an electrical quantity representative of the measured quantity.

The device comprises a transducer providing a raw measurement of the determined quantity, a processing stage for conditioning the raw measurement, the processing stage including an input connected to the transducer and an output port and a regulator including an input port electrically connected to the two connection terminals of the two-wire interface and an output port supplying regulated voltage to the transducer and/or to the processing stage.

The device is remarkable in that the output port of the processing stage is connected to the input port or to the output port of the regulator and in that the device includes a feedback circuit electrically connected to the input port of the regulator and to the processing stage.

Since the feedback loop includes the regulator, the possible influence of this element can be robustly compensated.

According to other advantageous and non-limiting characteristics of the invention, taken either separately or in any technically feasible combination:
- the processing stage includes a filter unit and an amplification unit;
- the regulator is a series regulator;
- the series regulator includes an energy storage device;
- the regulator is a step-up voltage regulator, such as a switching regulator;
- the electronic measuring device is configured to be supplied with constant current, the electrical quantity conveyed in return being a voltage;
- the transducer is an accelerometer;
- the accelerometer is a piezoelectric accelerometer;
- the accelerometer is a MEMS accelerometer.

BRIEF DESCRIPTION OF THE DRAWINGS

Further characteristics and advantages of the invention will appear from the following detailed description of the invention, made in reference to the appended figures, among which:

FIGS. 5a and 5b respectively show a first and a second example of a measuring device according to the configuration of FIG. 4a;

FIG. 6c shows an alternative embodiment of the first example of FIG. 6a.

DETAILED DESCRIPTION OF THE INVENTION

To ensure the simplicity of the following description, the same references will be used for elements that are identical or perform the same function in the various disclosed embodiments of the product.

The term "port" of an electronic circuit refers to a pair of conductive elements of the circuit electrically connecting it to another one. The currents flowing through these conductive elements are equal and in opposite directions. One of the conductive elements is usually connected to the ground, and the other one conveys a "useful" voltage. The port voltage corresponds to the voltage developing between these two elements. It is equal to the useful voltage conveyed by one of the elements when the other is connected to an electrical ground. A circuit can have an "input" and an "output" port, without these designations, which make it possible to distinguish one port from the other one, imposing any operating direction on the circuit.

Figure 1:
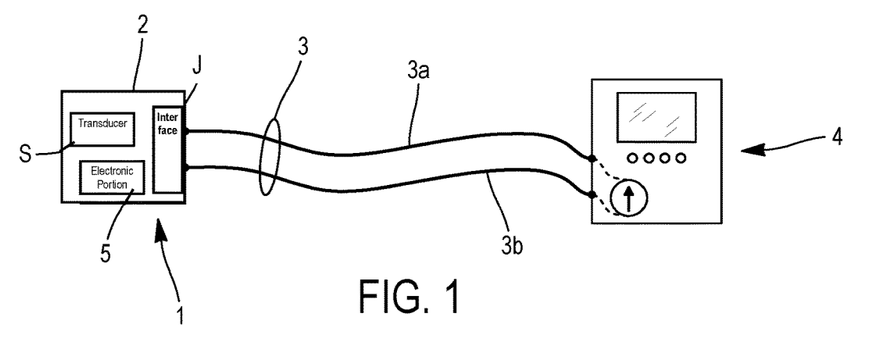
FIG. 1 shows a measuring system using an electronic measuring device.

FIG. 1 shows a measuring system using an electronic measuring device 1 as described in this disclosure.

The electronic measuring device 1 includes at least one transducer S for measuring a determined quantity. It can thus be an accelerometer used to acquire the vibration characteristics of a machine or equipment which the device 1 is attached to. The accelerometer can implement a measurement technology based on the use of a piezoelectric, capacitive or any other physical effect. It can be implemented by microelectronic integration technology and can be, for example, in the form of a micro-electro-mechanical system (MEMS).

In a particular exemplary embodiment, the transducer is a monoaxial, biaxial or triaxial MEMS accelerometer, i.e. providing an acceleration measurement in one, two or three directions. When a plurality of measurements are available, these measurements can be electrically combined with each other so that the measuring device can provide a combined acceleration measurement. The MEMS measurement direction(s) can be positioned at 45° from the transducer measurement axis.

The various forms that the accelerometer, or more generally the transducer S, can take, can give it particular characteristics such as the ability to measure quantities evolving according to a relatively high or low frequency range, or the need to be supplied with energy, or to be able to operate in an energy-sufficient way, etc.

However, the electronic measuring device 1 of this description is not limited to a particular transducer type, and any transducer S providing a raw measurement of a quantity to be measured may be suitable. This raw measurement can be materialized as a voltage, a load, a current, a resistance, and more generally as any electrical quantity that can be conditioned by the electronic measuring device 1, as it will be explained in details in the following section. As additional examples, the transducer S can form a pressure or temperature sensor, a microphone, an optical sensor.

Returning to the description of FIG. 1, the electronic measuring device 1 consists of a housing 2 in which the various components of the device are arranged. However, without going beyond the scope of the present invention, the elements of the measuring device 1 can be provided so as not to be placed in the same housing, or even no housing can be provided.

In the example shown in FIG. 1, in addition to the transducer S, the measuring device 1 includes a two-wire interface J with two connection terminals for connecting two lead wires 3a, 3b to the electronic measuring device 1. The pair of wires 3a, 3b will be referred to as the "conductive pair 3" in the remainder of this disclosure. The two-wire interface J forms an output port of the measuring device 1, with the voltage developing at this port being representative of the measured quantity. One of the wires 3a, 3b of the conductive pair has an electrical ground and the other one, the useful voltage.

The two-wire interface J can take any suitable form to connect the conductive pair 3 electrically to the device 1 and, possibly, mechanically to the housing 2. In a particular exemplary embodiment, the conductive pair 3 consists of a coaxial cable formed, as is well known per se, a central conductor wire for conducting the useful voltage, a dielectric material surrounding the central conductor wire and an outer conductive sheath forming the second wire of the pair 3 and associated with the system ground. This electro-magnetically isolates the signal flowing through the central conductive wire, making the measurement robust to electromagnetic disturbances that can be intense in an industrial environment. The two-wire interface J in this case consists of a male or female coaxial connector. Alternatively, the conductive pair 3 can consist of two wires 3a, 3b encapsulated in a shielded sheath. In this case, the two-wire interface J can electrically connect the sheath to the ground of the box 2, and connect the electrical ground of the device 1 to one of the two wires of the conductive pair 3.

The measuring system shown in FIG. 1 also includes measuring equipment 4. The measuring equipment 4 is connected to the electronic measuring device 1 via the conductive pair 3. The measuring equipment 4 in FIG. 1 has a dual function. It acquires the measurements provided by the measuring device 1 to visualize, record or analyze same. It is also a source of energy to electrically power the measuring device 1.

More specifically, the measuring equipment 4 includes a current source connected to the conductive pair 3, the latter supplying constant current to the measuring device 1. At the same time, the measurement established by the electronic measuring device 1 at the output port thereof is conveyed back by the conductive pair 3 to the measuring equipment 4 for processing.

As stated in the introduction to this application, such an embodiment of the measuring device 1 is known as IEPE when the transducer is a piezoelectric accelerometer. And in this case, the current source typically provides a high impedance current of a few milliamperes (between 2 and 20 milliamperes). The voltage developing between the two wires of the conductive pair 3 is typically between 0V and 24V. It is of course possible to provide that the power source will not be integrated into the measuring equipment 4 but will form a separate part of the system.

Returning to the general description of the measuring device 1 in FIG. 1, it comprises an electronic portion 5 between the transducer S providing the raw measurement of the determined quantity and the two-wire interface J. This portion, electrically connected to the transducer S and the interface J, includes a plurality of discrete or integrated electronic components (such as resistors, capacitors, inductors, transistors, amplifiers, etc.) arranged on one or more PCB-type electronic board(s).

Figure 2:
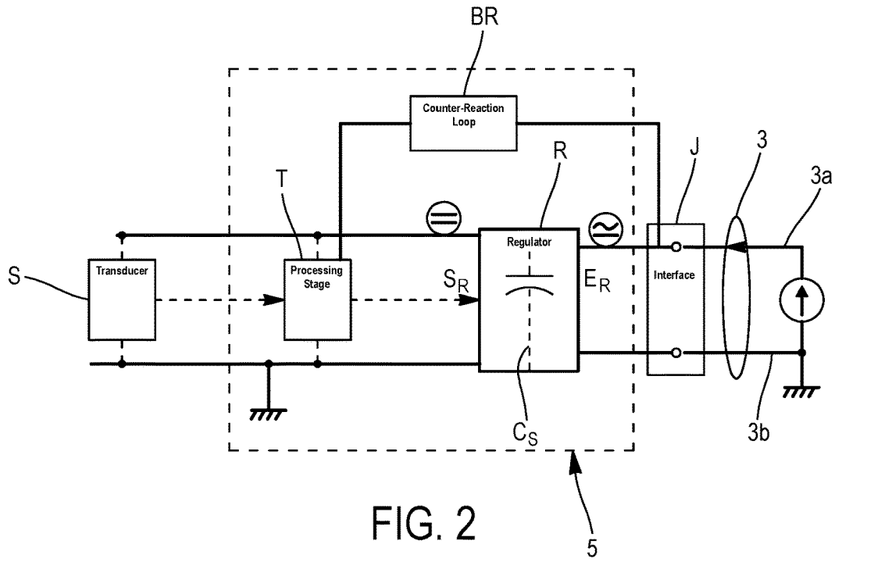
FIG. 2 shows a block diagram of the measuring device.

FIG. 2 shows a schematic diagram of the electronic measuring device 1. In this figure, the conductive pair 3 connected to a current source is electrically connected to the two-wire interface J.

A first part of the electronic components of the electronic portion 5 constitutes a processing stage T intended to condition the raw measurement provided by the transducer S. This stage therefore includes one input connected to the transducer S and one output port providing a conditioned electrical signal. This output port can be electrically connected to the input or output ports of a regulator R, as described in greater details later in this description. In all cases, the conditioned electrical signal provided by the output port of the processing stage T modulates the voltage of the output port of the measuring device 1, to convey on the conductive pair 3 an electrical voltage representative of the measured quantity.

The conditioning of the raw measurement performed by this processing stage T may include the amplification of the loads or voltage supplied by the transducer S and/or the filtering thereof, for example through a Butterworth, Bessel, Chebyshev or any other type of filter. Packaging can be of any other nature, such as to provide an effective value of the raw measurement or even to include digital processing of the measurement.

This conditioning is assisted by a counter-reaction loop BR allowing the output voltage of the measuring device 1 to be injected into the processing stage T. This loop can include any type of passive or active components. It can be used to fix or stabilize the gain and/or bias of the measuring device 1, as is well known per se.

Another part of the electronic components in the part 5 of the device 1 forms a regulator R to supply voltage to the processing stage T and/or to the transducer S. This regulator R includes an input port Er electrically connected to the two connection terminals of the two-wire interface J, on which a variable voltage is therefore applied. It also includes an output port Sr supplying regulated voltage to the transducer S and/or to the processing stage T.

Figure 3A:
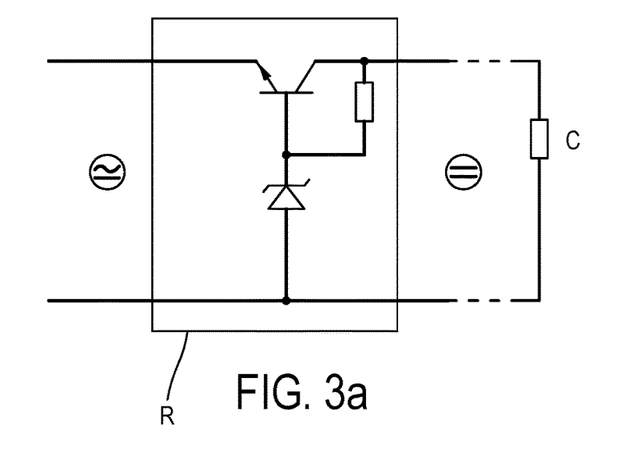
FIGS. 3a to 3d show, respectively and schematically a non-servo-controlled series regulator, a servo-controlled series regulator, a Zener diode regulator and a switching regulator.

A two-port regulator R compatible with a measuring device 1 can be realized in many forms. For example, it can be a series regulator, positioned in series between a load C, here the processing stage T and/or the transducer S, and a variable voltage, here the voltage conveyed by the conductive pair 3. Such a circuit causes a voltage drop between its input port and its output port, regardless of the voltage at this input port greater than the output voltage, so as to keep the voltage delivered at the output port constant. The current absorbed by the input port is returned to the output port. Such a series regulator is shown schematically in FIG. 3a in an open loop configuration, and in FIG. 3b in a configuration including a regulated voltage servo-control.

Figure 3B:
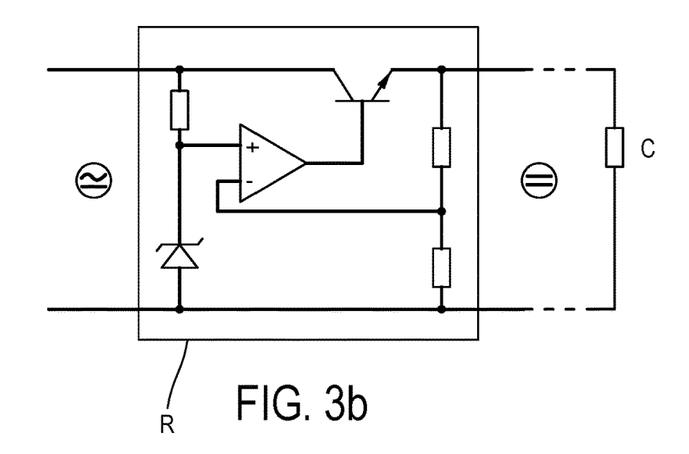
Figure 3C:
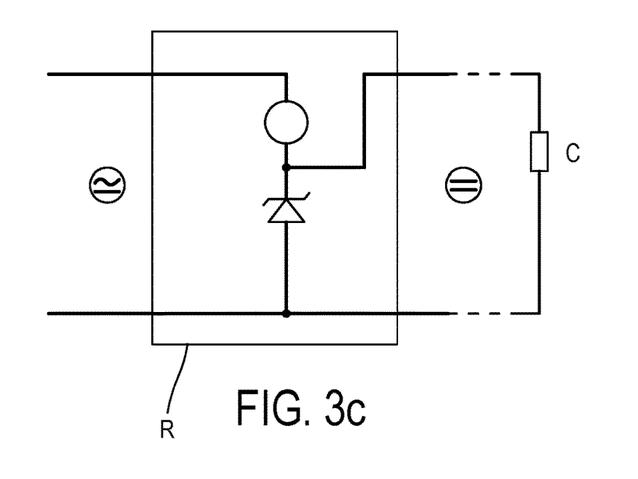

As an additional example, it can be a Zener diode regulator, possibly supplemented by a current source (a resistor, a transistor), as shown in the circuit diagram of FIG. 3c.

In these two examples, the output dynamics of the measuring device 1, i.e. the possible voltage excursion between a minimum voltage and a maximum voltage, is limited. For the device to be functional, it is necessary for the voltage at the output port of the measuring device 1, which also corresponds to the voltage at the input port Er of the regulator R, to remain higher than the supply voltage of the other elements of the device 1 plus a drop-out necessary for the operation of the regulator R itself. Thus, to supply the components of the measuring device 1 with a regulated voltage of 5V, the voltage at the input port Er of the regulator R, and therefore the voltage at the output port of the measuring device 1, cannot fall below a minimum value of about 6V or 7V.

To avoid this, the regulator R can be equipped with an energy storage device Cs, for example a capacity. The storage device allows energy to be stored when the voltage at the input port Er of the regulator R is higher than the minimum threshold voltage, and to restore this energy and maintain the regulated voltage when the voltage at the input port is higher than this threshold voltage. The sizing of this storage device (e.g. capacity) of course depends on the characteristics of the measured quantity. This solution is particularly well adapted to quantities that do not evolve at low frequency, less than 1 Hz or 10 hz, and therefore unlikely to present a voltage below the threshold voltage for an extended period of time.

Figure 3D:
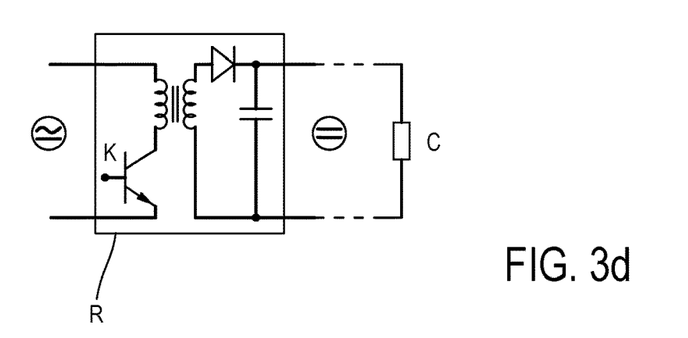

Alternatively, the regulator R can consist of a switching regulator that can operate as a voltage step-up device, shown schematically in FIG. 3d. This alternative is particularly suitable for measuring quasi-static quantities, such as atmospheric pressure measurement. Measuring such a quantity is likely to provide, at the output port of the device 1, a voltage lower than the threshold voltage of a series regulator for very long periods of time. This relatively low voltage cannot therefore be easily compensated by a storage device with a size compatible with the one of the measuring device 1. For example, using a step-up voltage regulator, such as a switching regulator, a 3V voltage at the conductive pair 3 can be transformed into a 5V voltage at the output port Es of the regulator R, thus supplying the active elements of the device 1. In this case, an additional circuit, powered by the regulator R itself, can be provided to provide the switching signal K.

A step-up voltage regulator can also be operated by a switched capacitor device.

Figure 4A:
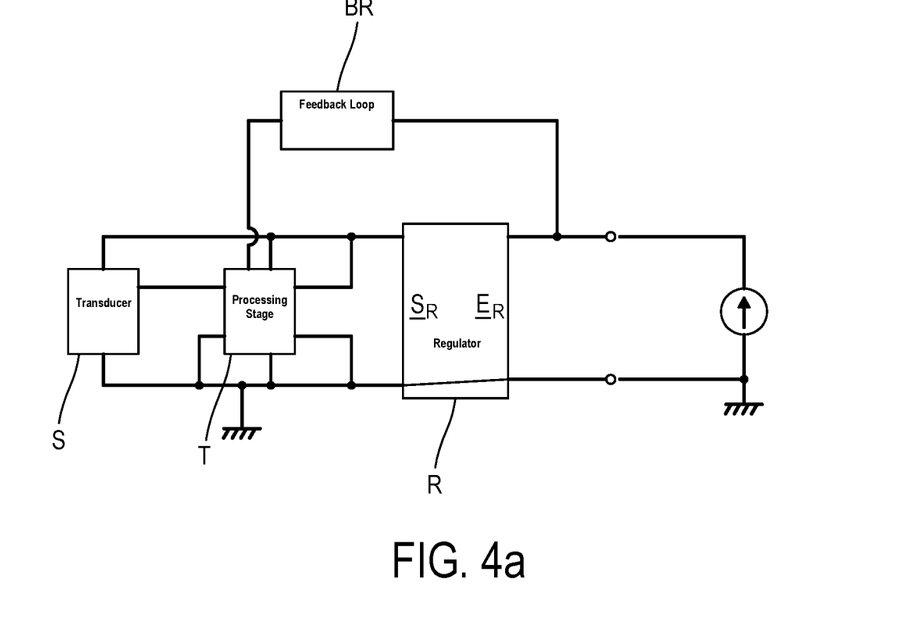
FIGS. 4a and 4b show two possible configurations of the measuring device.
Figure 4B:
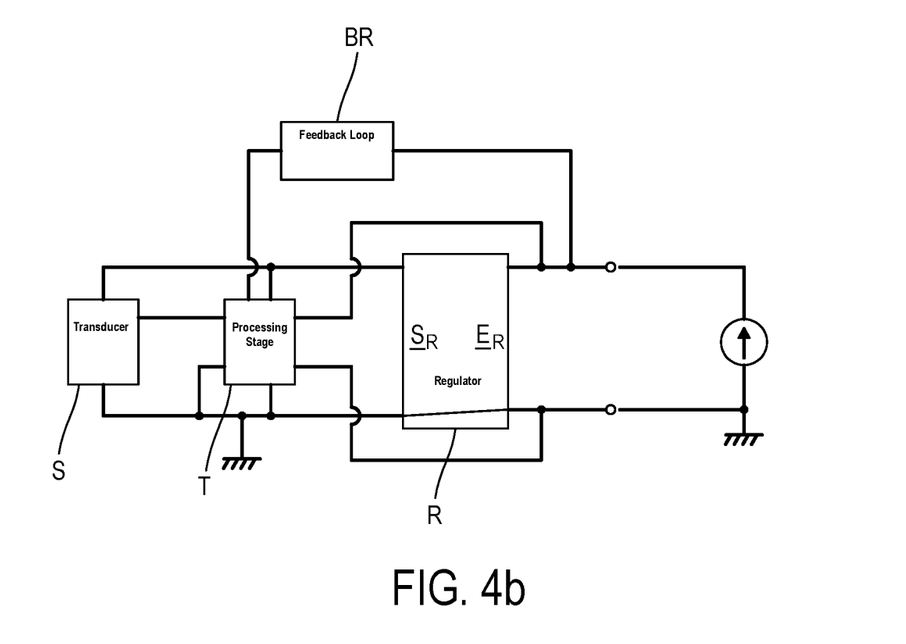

Regardless of the nature chosen for the regulator R and the processing stage T, these two elements of the electronic portion 5 of the measuring device 1 can be connected to each other in two configurations schematically shown in FIGS. 4a and 4b.

In the first configuration of FIG. 4a, the output port of the processing stage T is electrically connected to the output port Sr of the regulator R. In the second configuration of FIG. 4b, the output port of the processing stage T is electrically connected to the input port Er of the regulator R. In both cases, the conditioned signal of the available measurement at the output port of the processing stage T modulates the voltage of the conductive pair 3 so that it is representative of the quantity measured by the transducer S.

Of course, the electronic portion 5 of the measuring device 1 may include other electronic components to perform other functions or to complete the functions of processing the raw measurement and providing a regulated supply voltage. Capacities with decoupling functions or resistors arranged as a divider bridge to set the bias at the conductive pair 3 can thus be provided, if this function is not included in the feedback loop BR.

In operation, the electronic measuring device 1 is therefore connected, via the conductive pair 3, to a current source, which can be positioned in the measuring equipment 4. This source provides a nominal current, for example of a few milliamperes, and is capable of holding a voltage range that defines the dynamics of the measurement. This dynamic range can be between 0 and 24 volts, for example.

The feedback loop BR or additional electronic components of the electronic portion 5, define the bias provided to the conductive pair 3 by the device 1. The "bias" refers to the voltage at the conductive pair 3 when the determined quantity has a reference value. For example, when the transducer is an atmospheric pressure sensor, the reference value can be a pressure of 1atm. When the transducer S is an accelerometer, the reference value can be a zero acceleration. In general, the bias is so chosen as to be higher than the regulated voltage of the power supply of the transducer S and/or the processing stage T, taking into account the drop-out of the regulator R itself. If the regulator has the ability to store energy or to operate as a voltage step-up device, the bias can be chosen more freely, typically at the mid-point of the dynamics.

When the measured quantity is at its reference value, the bias is established in the conductive pair 3, at the two-wire interface J and the input port Er of the regulator R. The regulator provides, at its output port Sr, the regulated supply voltage to the processing stage T and/or to the transducer S, which are therefore well functional.

Variations in the measured quantity lead to a variation in the raw measurement provided by the transducer S. The raw measurement is provided at the input of the processing stage T to filter and/or to amplify same. The output port of the processing stage T is connected to the input port Er or to the output port Sr of the regulator R to, in any case, modulate the voltage at the conductive pair 3 and make it representative of the measured quantity.

Advantageously, the amplification gain of the processing stage T will be chosen to take advantage of all the possible voltage dynamics. For example, in the case where the transducer S is an accelerometer, the gain of the processing stage T can be adjusted to obtain a measuring sensitivity equal to or greater than 100 mV/g or 500 mV/g, where g is an acceleration unit corresponding approximately to the acceleration of gravity at the Earth's surface. For a dynamic range between 0V and 24V, a bias set at 12V and a threshold limit of 7V to regulate the supply voltage of 5V volts, measuring dynamics of 50 g for a sensitivity of 100 mV/g or 10 g for a sensitivity of 500 mV/g is available. In a device that can exploit the full dynamic range between 0V and 24V, a bias set at 12V, a dynamic range of 100 g is available for a sensitivity of 100 mV/g.

Figure 5A:
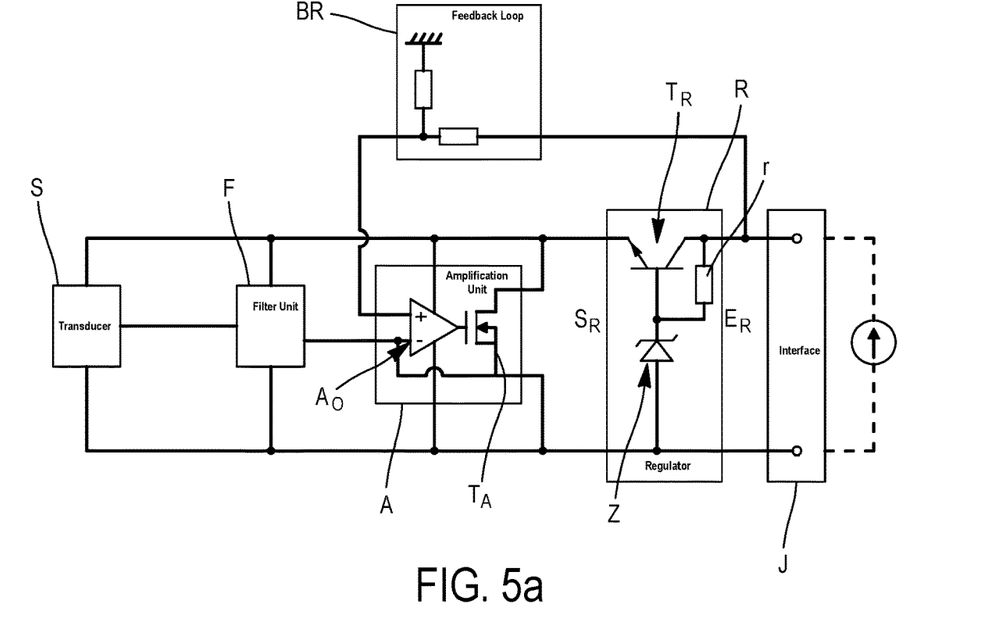

With reference to FIG. 5a, a first example of an electronic measuring device 1 in accordance with the first embodiment of FIG. 4a is now disclosed.

In this example, the transducer S and the two-wire interface J are present. The transducer can be a MEMS accelerometer powered by a 5V voltage. The processing stage T here consists of a first unit F for filtering the raw measurement and a second amplification unit A, electrically connected to each other in series. The regulator R here consists of a series regulator, comprising a transistor Tr arranged between a conductive element of the input port Er and a conductive element of the output port Sr, and a Zener diode Z (the characteristics of which essentially determine the regulated voltage at the output port Sr of the regulator R) placed in the base of the transistor Tr and connected to the electrical ground of the circuit. This electrical ground is also connected to the second conductive element of the input port Er and the output port Sr of the regulator R. A resistor r is arranged between a terminal of the transistor Tr and the base thereof. Therefore, a regulated voltage, for example 5V, is available on the output port Sr, which is distributed over the power pins of the transducer S and the processing stage T, consisting of the filter unit F and the amplification unit A.

The amplification unit A includes an operational amplifier Ao powered from the voltage supplied by the regulator R. This operational amplifier receives, at a first differential input, the raw measurement from the filter unit F and, at a second differential input, a voltage supplied by the feedback loop BR.

The output of the operational amplifier Ao is connected to a transistor Ta positioned between the two conductive elements forming the output port of the amplifier unit A. This port is connected to the output port Sr of the regulator R.

The feedback loop consists here of simple resistors, configured as a divider bridge.

When a deviation exists at the differential input of the amplifier Ao, the transistor Ta absorbs a current at the output port Sr of the regulator R. This compensates, together with the feedback effect of the loop BR, the absorbed current by adjusting the voltage at its input port Er. In this way, the voltage between the terminals of the two-wire interface J and conveyed on the conductive pair 3 is modulated, according to the raw measurement provided by the transducer S.

Figure 5B:
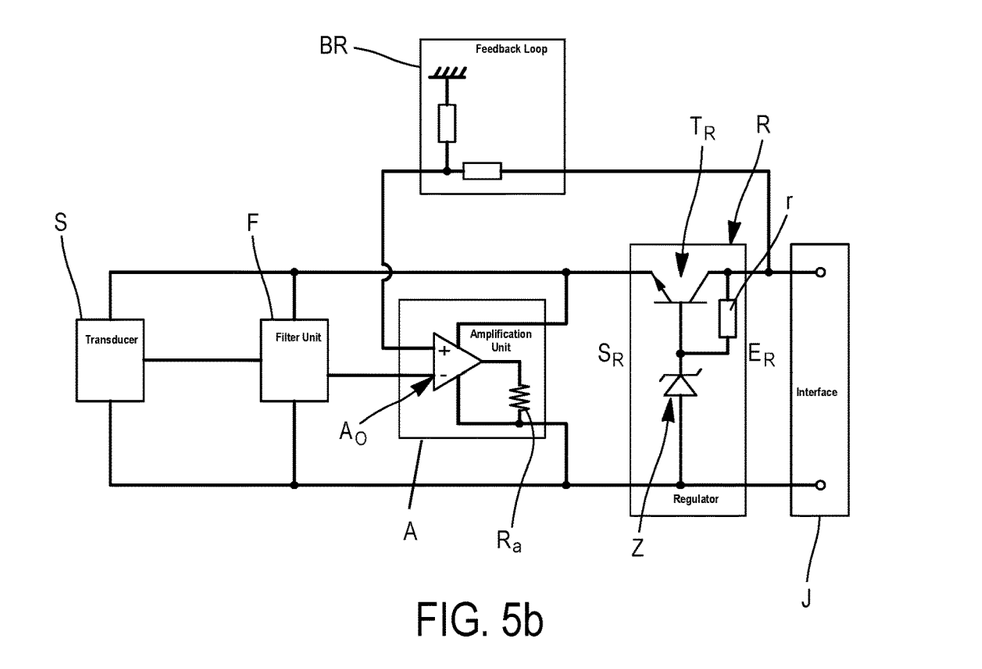

FIG. 5b shows a second example of an electronic measuring device 1 in accordance with the first embodiment of FIG. 4a. In this second example, only the amplification unit A is modified as compared to the previous example. The description of the other units or elements of the device of this second example is therefore omitted for the sake of brevity.

In this second example, the amplification unit A is remarkable in that its output port, connected to the output port Sr of the regulator R, is also connected to the power pins of the operational amplifier Ao. When a deviation is present at the differential inputs of the operational amplifier Ao, the output of the amplifier is discharged into a resistance Ra leading to an increase in the supply current of this amplifier. In this way, the current at the output port Sr of the regulator R is consumed, which compensates similarly to what has been described in relation to the description of FIG. 5a.

Figure 6A:
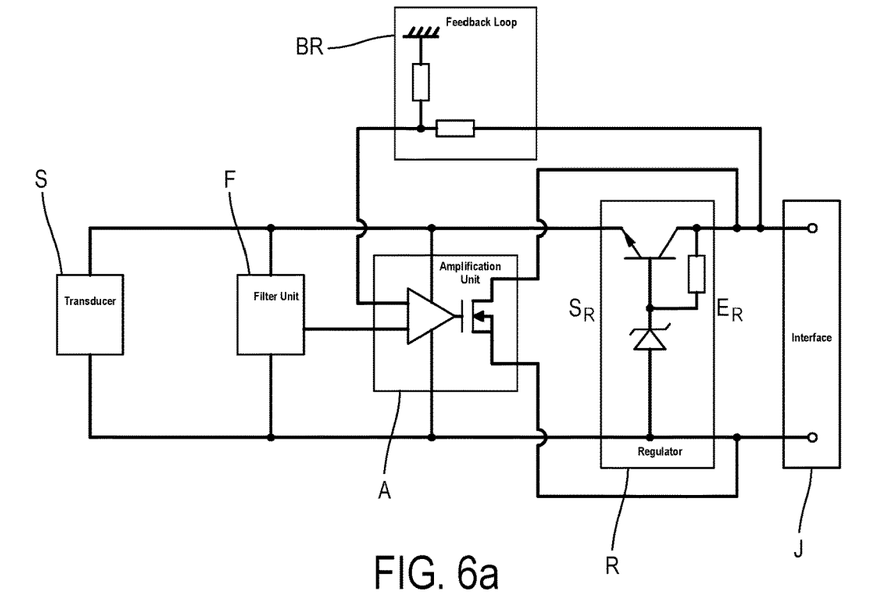
FIGS. 6a and 6b respectively show a first and a second example of a measuring device according to the configuration of FIG. 4b.

FIG. 6a shows a first example of a measuring device 1 in accordance with the second embodiment of FIG. 4b. The transducer S, the filter unit F, the series regulator R, and the two-wire interface J of the two previous examples can be seen in this example. In this example, the output port of the amplification unit A is connected to the input port Er of the regulator R. The amplification unit is identical to the one of FIG. 5a. In operation, with a deviation at the differential inputs of the operational amplifier, a part of the current drifts to the input Er of the regulator, which leads to modulating this voltage.

Figure 6B:
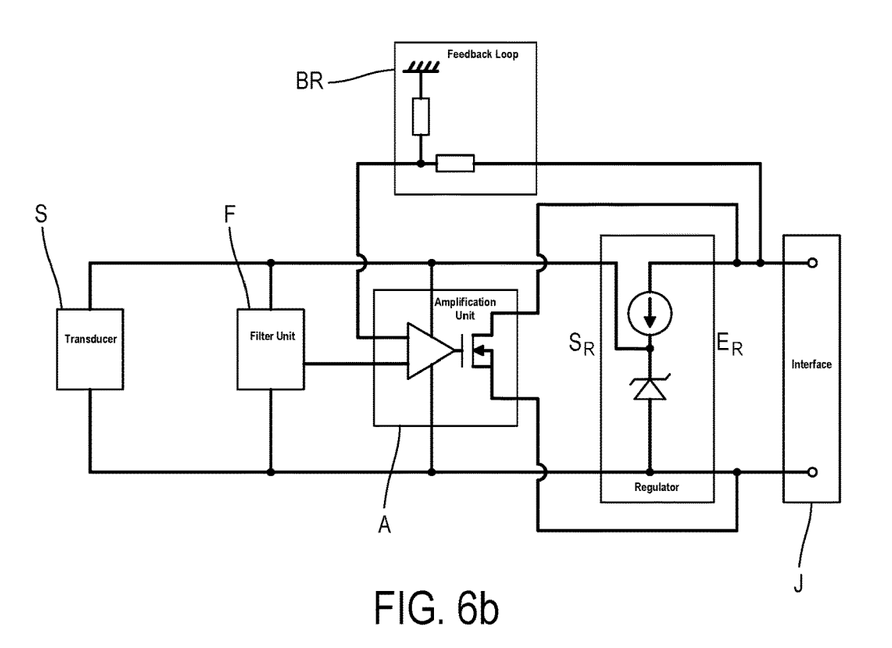

FIG. 6b shows a second example of a measuring device 1 which complies with the second embodiment of FIG. 4b. In this second example, the series regulator R of the previous examples has been replaced by an alternative regulator. This consists of a Zener diode Z arranged in series with a current source (e.g. a resistance). The output port Sr takes the voltage from the middle point defined at the terminals of the diode 2. The operating mode of the device 1 in this example is similar to the one of FIG. 6a.

Figure 6C:
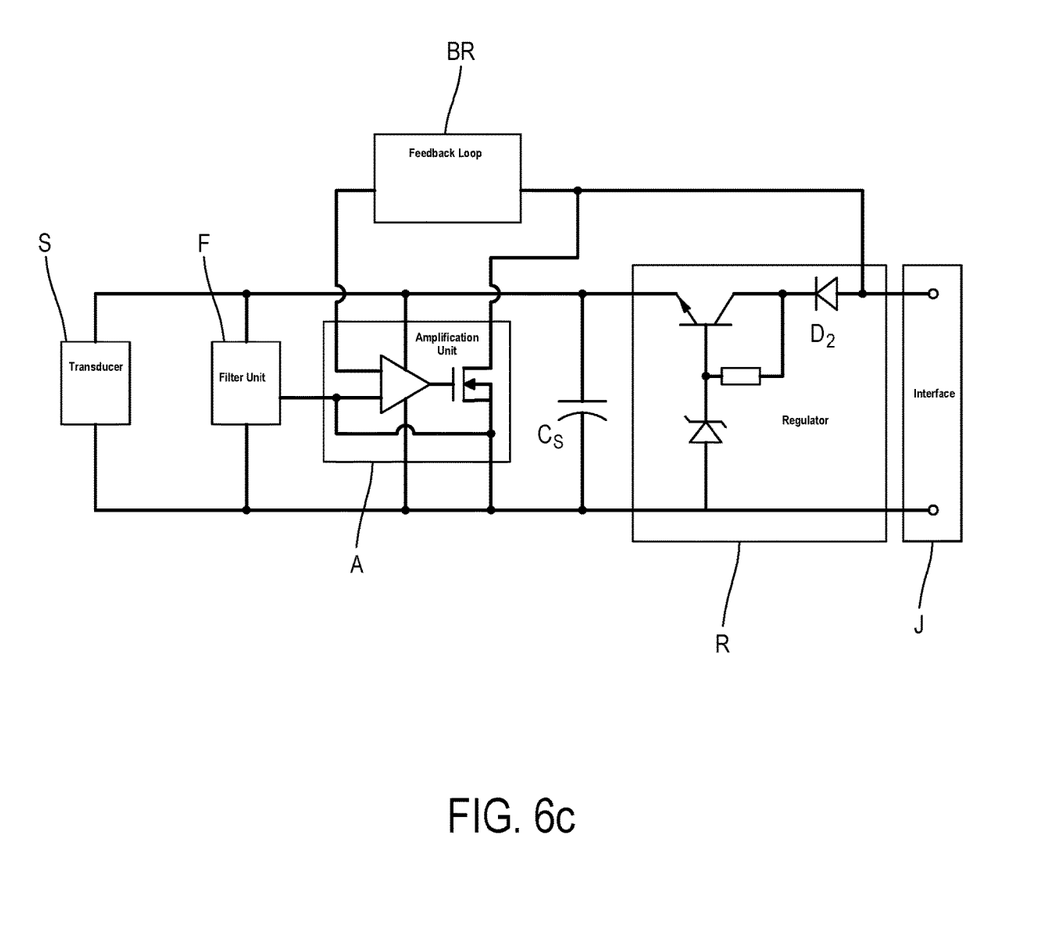

FIG. 6c shows a variant of the first example of the second embodiment presented in relation to the description in FIG. 6a. In this variant, a storage device Cs is provided, here a capacity the value of which can typically be between 10 and 50 microfarad when the transducer is a MEMS accelerometer powered by a 5V voltage. A blocking diode D2 is also provided to avoid discharging the storage device through the regulator R and the output stage of the amplifier A.

Of course, the invention is not limited to the described embodiments and alternative solutions can be used without leaving the scope of the invention as defined in the claims.

Thus, although the measuring device has been presented for constant current supply, with the voltage being modulated to convey on the conductive pair 3 a voltage representative of the measured quantity, the same principles as those exposed could be applied to provide a device supplied at constant voltage, which would modulate the current flowing in the conductive pair to convey the measured quantity.

In addition, the device can have a plurality of transducers, powered by the regulator. In this case, the measurements provided by these transducers can be combined with each other, for example to provide an average value, before being conveyed on the conductive pair.

The invention claimed is:

1. An electronic device for measuring a determined quantity, the device having a two-wire interface having two connection terminals intended to be connected to a conductive pair supplying the electronic device and conveying in return an electrical quantity representative of the measured quantity, the device comprising:
    a transducer providing a raw measurement of the determined quantity;
    a processing stage for conditioning the raw measurement, the processing stage including an input connected to the transducer and an output port; and
    a regulator comprising an input port electrically connected to the two connection terminals of the two-wire interface and an output port supplying regulated voltage to the transducer and/or to the processing stage, wherein the output port of the processing stage is connected to the input port or to the output port of the regulator and in that the device includes a feedback circuit electrically connected to the input port of the regulator and to the processing stage.

2. The electronic device according to claim 1, wherein the regulator is a series regulator.

3. The electronic device according to claim 2, wherein the series regulator further comprising an energy storage device.

4. The electronic device according to claim 1, wherein the regulator is a step-up voltage regulator.

5. The electronic device according to claim 4, wherein the step-up voltage regulator is a switching regulator.

6. The electronic device according to claim 1, wherein the transducer is an accelerometer.

7. The electronic device according to claim 6, wherein the accelerometer is a piezoelectric accelerometer.

8. The electronic device according to claim 6, wherein the accelerometer is a MEMS accelerometer.

9. An electronic device for measuring a determined quantity, the device having a two-wire interface having two connection terminals intended to be connected to a conductive pair supplying the device and conveying in return an electrical quantity representative of the measured quantity, the device comprising:
    a transducer providing a raw measurement of the determined quantity;
    a processing stage for conditioning the raw measurement, the processing stage having a filter unit and an amplification unit including an input connected to the transducer and an output port; and
    a regulator comprising an input port electrically connected to the two connection terminals of the two-wire interface and an output port supplying regulated voltage to the transducer and/or to the processing stage, wherein the output port of the processing stage is connected to the input port or to the output port of the regulator and in that the device includes a feedback circuit electrically connected to the input port of the regulator and to the processing stage.

10. The electronic device according to claim 9, wherein the regulator is a series regulator.

11. The electronic device according to claim 10, wherein the series regulator further comprising an energy storage device.

12. The electronic device according to claim 9, wherein the regulator is a step-up voltage regulator.

13. The electronic device according to claim 12, wherein the step-up voltage regulator is a switching regulator.

14. The electronic device according to claim 9, wherein the transducer is an accelerometer.

15. The electronic device according to claim 14, wherein the accelerometer is a piezoelectric accelerometer.

16. The electronic device according to claim 14, wherein the accelerometer is a MEMS accelerometer.

17. An electronic device for measuring a determined quantity, the device having a two-wire interface having two connection terminals intended to be connected to a conductive pair supplying the electronic device and conveying in return an electrical quantity representative of the measured quantity, the device comprising:
    a transducer providing a raw measurement of the determined quantity;
    a processing stage for conditioning the raw measurement, the processing stage including an input connected to the transducer and an output port; and
    a regulator comprising an input port electrically connected to the two connection terminals of the two-wire interface and an output port supplying regulated voltage to the transducer and/or to the processing stage, wherein the output port of the processing stage is connected to the input port or to the output port of the regulator and in that the device includes a feedback circuit electrically connected to the input port of the regulator and to the processing stage and wherein the device is configured to be supplied with constant current, an electrical quantity conveyed in return being a voltage.

18. The electronic device according to claim 17, wherein the transducer is an accelerometer.

19. The electronic device according to claim 18, wherein the accelerometer is a piezoelectric accelerometer.

20. The electronic device according to claim 18, wherein the accelerometer is a MEMS accelerometer.

* * * * *